Figure 1:
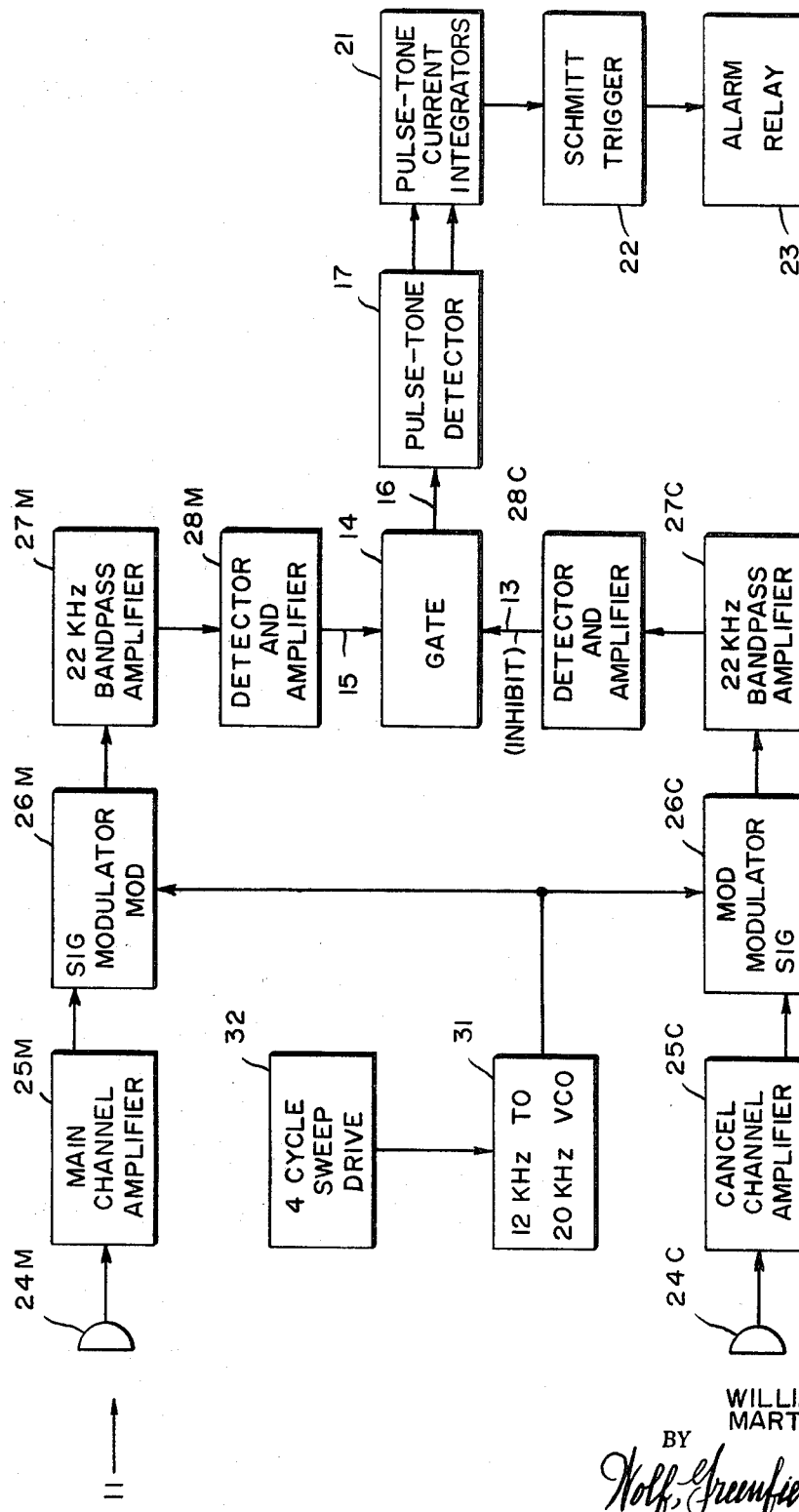

WILLIAM L. COTTER
MARTIN H. REISS
BY
Wolf, Greenfield & Hicken
ATTORNEYS

United States Patent Office

3,471,846
Patented Oct. 7, 1969

3,471,846
SOUND RESPONSIVE INTRUDER DETECTION CIRCUIT
William L. Cotter, Danvers, and Martin H. Reiss, Natick, Mass., assignors to Vandalarm Security Systems, Inc., Newton, Mass., a corporation of Massachusetts
Filed Aug. 25, 1966, Ser. No. 575,041
Int. Cl. G08b 13/00
U.S. Cl. 340—258    10 Claims The present invention relates in general to signal discrimination and more particularly concerns apparatus and techniques for discriminating between alarm and nonalarm signals while maintaining exceptionally high sensitivity to alarm signals, even in the presence of nonalarm signals.

According to the invention there are first and second modulating means for modulating first and second input signals with a common modulating signal to provide first and second modulated output signals, respectively. The modulating signal is preferably swept over a prescribed frequency range between an upper limit frequency and a lower limit frequency. First and second selective transmission means for transmitting spectral components of the first and second modulated output signals centered about a predetermined frequency, respectively, couple the output of the first modulating means and the output of the second modulating means, respectively, to first and second detecting means, respectively. The latter detecting means provide an output signal when the associated selective transmission means transmits a spectral component substantially of said predetermined frequency. Gating means coupled to the output of the first detecting means and the output of the second detecting means functions for inhibiting the transmission of a gated output signal from the first detecting means only when the first and second selective transmission means are simultaneously transmitting spectral components of the predetermined frequency.

Preferably, one of the input signals corresponds to that provided by a main channel passing both alarm or unfriendly and nonalarm or friendly signals and the other corresponds to that provided by a cancel channel providing substantially only nonalarm signals. The presence of signals having the same spectral component at substantially the same time results in inhibition of the gating means while the presence of spectral components in only one channel results in the provision of a gated output signal by the gating means.

In an exemplary embodiment of the invention where alarm signals of audio frequency are detected in the channel that transmits both alarm and nonalarm signals, the difference between the lower limit frequency and the predetermined frequency preferably corresponds to a first difference frequency at the high end of the audio spectrum, typically 10 kHz., while the difference between the upper limit frequency and the predetermined frequency corresponds to a second difference frequency that is an audio frequency lower than the first difference frequency, typically 2 kHz., the difference between the upper limit frequency and the lower limit frequency being the same as the difference between the first difference frequency and the second difference frequency.

In a typical acoustical alarm system a microphone, or other suitable acoustical transducer, is placed in an area to be kept under surveillance. An intruder, such as a burglar, produces what is termed an unfriendly noise that is detected to produce an alarm signal. However, there may be other sources of what is termed friendly noise in the area under surveillance, such as from a refrigerator. The sounds of an intruder typically have spectral components in the middle and upper audio frequency range.

Thus, on approach to discriminating between friendly and unfriendly noises is to include a high pass filter between the microphone and the detector. Some sources of friendly noise signals, such as a refrigerator motor, are characterized by spectral components in the same frequency range embracing some unfriendly noise signals. An approach to preventing such signals from producing an alarm signal is to use a cancellation channel with a cancellation microphone located very close to the friendly noise source. When this friendly noise source is on, the cancellation channel produces a signal that disables the main channel from sounding an alarm, typically by reducing the sensitivity of the main channel so that the signal from the distant friendly noise source is too low to provide an alarm while there is still sufficient sensitivity, hopefully, to detect an intruder sufficiently noisy and sufficiently near the main channel microphone. A serious disadvantage of this arrangement is that a quiet intruder may make his entry while the friendly noise source is on without being detected because of the reduced sensitivity of the main channel.

Accordingly, it is an important object of this invention to provide an improved alarm system capable of discriminating between friendly and unfriendly noise sources while retaining a high degree of sensitivity for detecting unfriendly noise sources.

It is another object of the invention to achieve the preceding object with means that discriminates between the contemporaneous emission of friendly and unfriendly noise signals.

It is a further object of the invention to achieve the preceding objects with means that simultaneously rejects spectral components of below a predetermined frequency.

It is another object of the invention to achieve the preceding objects with apparatus that is highly reliable and requires relatively few components having relatively uncritical parameter values.

Figure 2:
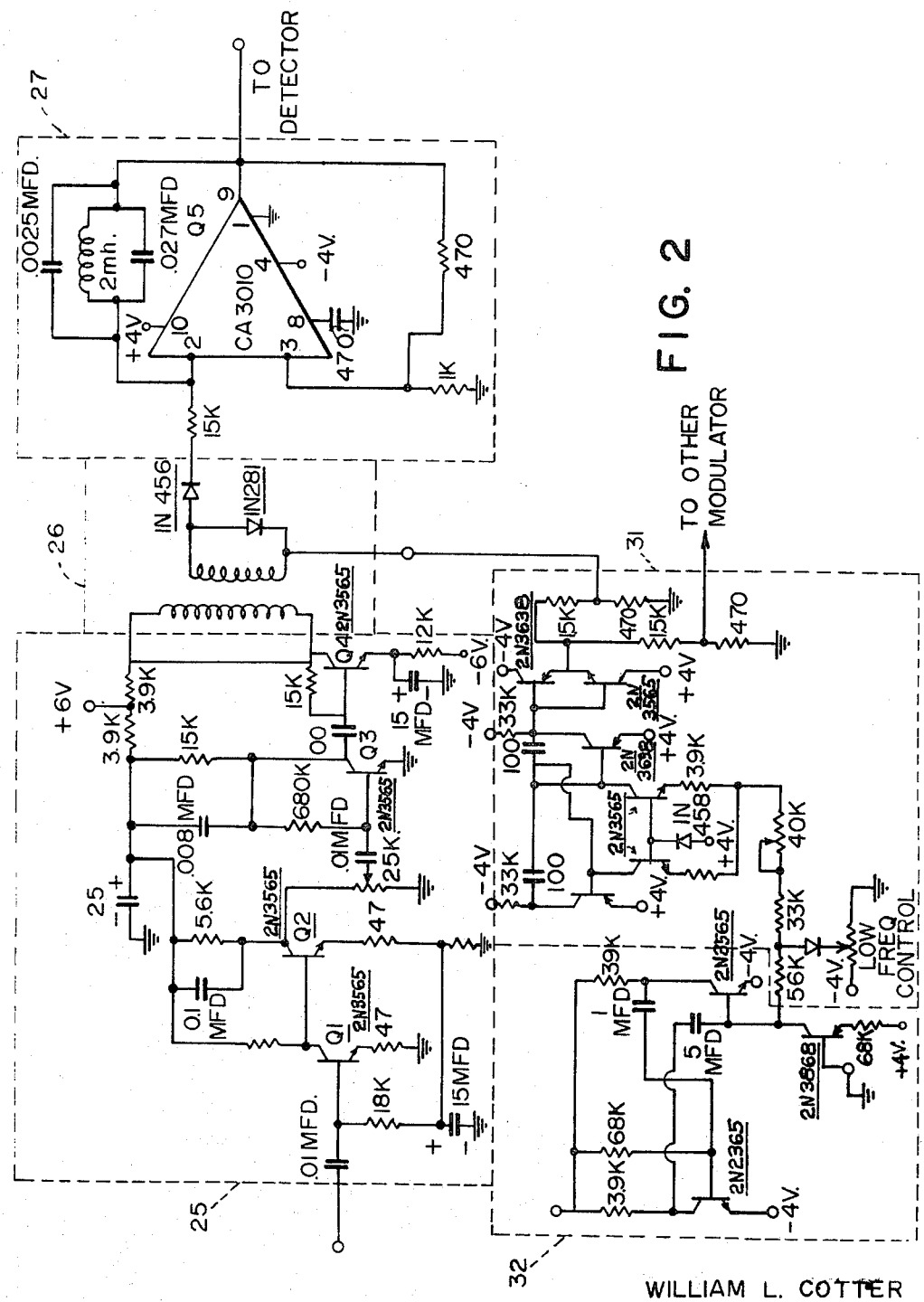
Figure 3:
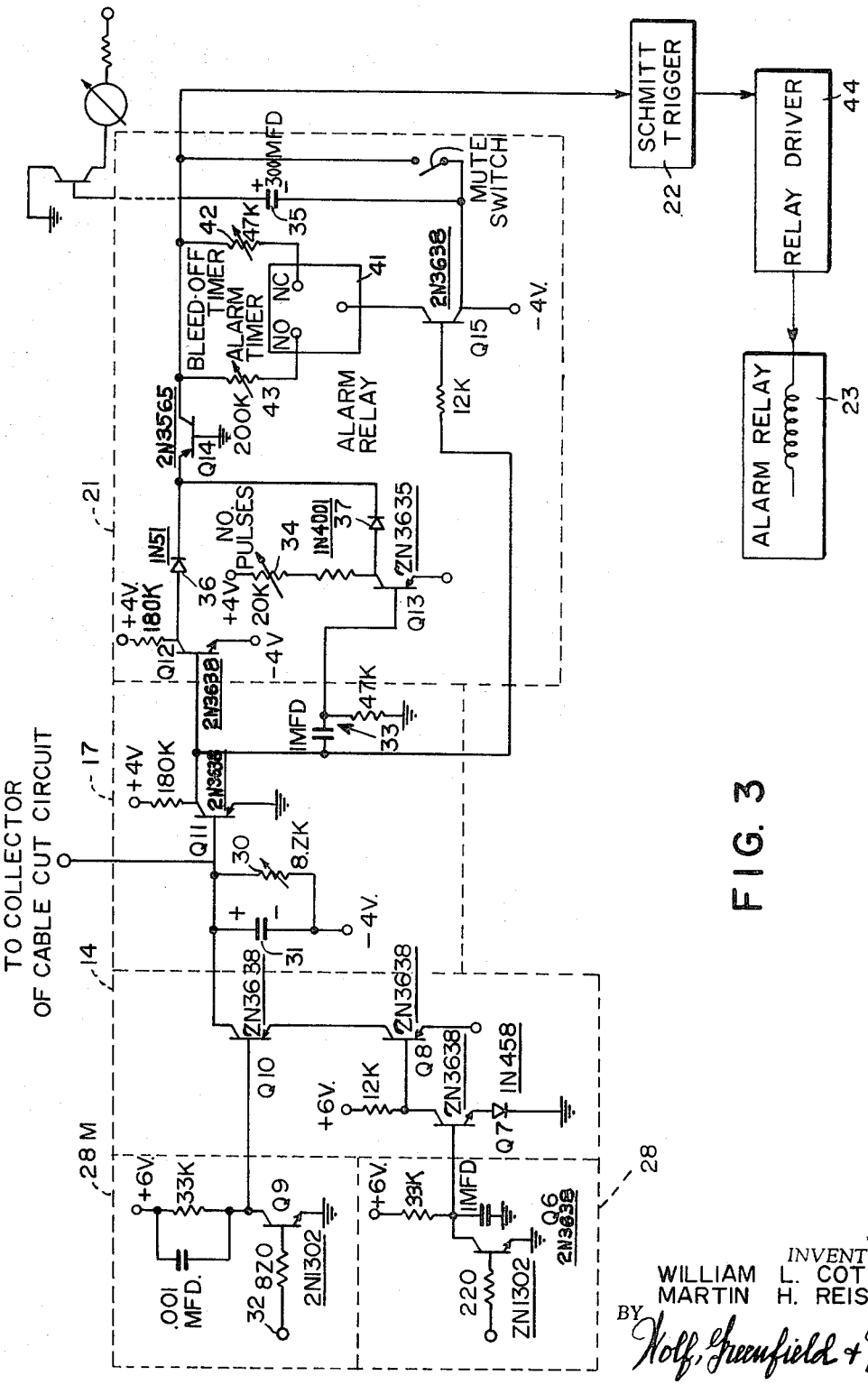

Numerous other features, objects and advantages of the invention will become apparent from the following specification when read in connection with the accompanying drawing in which:

FIG. 1 is a block diagram illustrating the logical arrangement of a system according to the invention; and FIGS. 2 and 3 show schematic circuit diagrams of preferred forms of certain elements of the system of FIG. 1.

With reference now to the drawing and more particularly FIG. 1 thereof, there is shown a block diagram illustrating the logical arrangement of a system according to the invention. There is a main channel 11 and a cancel channel 12. An output from the cancel channel 12 on inhibit line 13 disables gate 14 from transmitting a contemporaneously derived alarm signal on leg 15 of gate 14. When not thus inhibited, gate 14 provides an alarm signal on output line 16 that is detected by pulse-tone detector 17 and applied to pulse-tone current integrators 21 to trigger Schmitt trigger 22 after a predetermined number of such detected tones and thereby actuate alarm relay 23 to indicate an alarm condition.

Each channel includes a microphone, such as 24M and 24C (corresponding elements in the channels being designated by the same reference numeral but with an appended M for a main channel element and an appended C for a cancel channel element), a channel amplifier, such as 25M and 25C, a modulator, such as 26M and 26C, each having its signal input energized by the preceding channel amplifier, a 22 kHz. bandpass amplifier, such as 27M and 27C, and a detector and amplifier, such as 28M and 28C. The modulating inputs of modulators 26M and 26C are jointly energized by a voltage controlled oscillator 31 providing a signal that is swept in frequency from a lower limit frequency of 12 kHz. to an upper limit frequency of 20 kHz. at a 4 Hz. rate in response to the 4 Hz. sweep drive 32.

Having described the relationship among the different elements of the system, the mode of operation will be described. It is convenient to initially assume that voltage controlled oscillator 31 is commencing a sweep cycle and then emitting a frequency of 12 kHz. The modulators 26C and 26M mix this 12 kHz. signal with the audio signal then being amplified by main channel amplifier 25M and cancel channel amplifier 26C, respectively, to provide respective sum frequency signals on the respective outputs of modulators 26M and 26C. Since 22 kHz. bandpass amplifiers 27M and 27C respond only to spectral components very near 22 kHz., these amplifiers will transmit a signal only if there is a 22 kHz. spectral component in the respective modulated output signals, corresponding to an input signal received by a respective microphone 24M and 24C of 10 kHz. A respective detector and amplifier 28M and 28C would thereupon provide a signal on a respective line 15 and 13.

Since cancel channel microphone 24C is located near a friendly noise source, if such source is then on and has a 10 kHz. spectral component, this component will be picked up by both main microphone 24M and cancel microphone 24C and amplified sufficiently to simultaneously produce a signal on line 15 and a signal on inhibit line 13 so that gate 14 is then disabled. On the other hand if the 10 kHz. spectral component is from an unfriendly noise source, a signal is provided only on line 15 because the gain of cancel channel amplifier 25C is so much smaller than that of main channel amplifier 25M that detector amplifier 28C provides a signal only in response to emissions from the nearby friendly noise source. With gate 14 then enabled, pulse-tone detector 17 provides a signal to pulse-tone current integrators 21 which responds to the occurrence of a predetermined number of such signals sufficient to discriminate between an unfriendly source and a random noise to trigger Schmitt trigger 22 and thereby energize alarm relay 23.

The process just described is continuously carried out as voltage controlled oscillator 31 changes to its upper limit frequency of 20 kHz. If the only source of signals is the friendly noise source, each detected output signal on line 15 is accompanied by a contemporaneous inhibit signal on line 13. If in addition there is a signal from an unfriendly noise source, such unfriendly noise source is bound to have a spectral component not present in the friendly noise source so that gate 14 will provide an output signal on line 16 for each sweep to provide a sufficient number of alarm pulses to trigger Schmitt trigger 22.

By choosing the upper limit frequency as 20 kHz., the input signal spectral component must be at least substantially 2 kHz. to produce an output from 22 kHz. bandpass amplifier 27M, and the system also effectively functions as a high pass filter with an exceptionally high degree of attenuation in the stop band corresponding to the attenuation per cycle achieved with 22 kHz. bandpass amplifier 27. Referring to FIG. 2, there is shown a schematic circuit diagram of an exemplary embodiment of the main channel amplifier 25, the modulator 26 and the 22 kHz. bandpass amplifier 27, each of these circuits being used in both main channel 11 and cancel channel 12. There is also shown a schematic circuit diagram of the 4 Hz. sweep drive 32 and the voltage controlled oscillator 31. Since these circuits are all of a type known in the art, those skilled in the art will be able to practice the invention easily by following the schematic circuit diagram.

The 22 kHz. bandpass amplifier 27 comprises an integrated circuit operational amplifier of the type designated with approximately 60 db of gain. A 22 kHz. tank circuit is tied around the negative feedback loop and positive feedback is used to produce Q multiplication so that the 3 db bandwidth is of the order of less than 500 cycles. This means that the effective 3 db down point of the high pass filter formed by the system is at approximately 1750 Hz. when the upper limit frequency of the voltage controlled oscillator 31 is 20 kHz.

Referring to FIG. 3, there is shown a schematic circuit diagram of a preferred form of the main channel detector and amplifier 28M, the cancel channel detector and amplifier 28C, the gate 14, the pulse-tone detector 17 and the pulse-tone integrators 21. The quiet level at the output of each 22 kHz. amplifier 27 is about 100 millivolts. When a signal is received this level is raised to 300 or 400 mv. so that the 200 mv. $V_{be}$ of a germanium transistor may be used to discriminate between the quiet level of less than 200 mv. and the signal level of greater than 200 mv. Transistor Q9 and associated circuit components comprise the main channel detector and amplifier 28M, the collector capacitor providing some filtering of undesired high frequency components. Transistors Q7, Q8 and Q10 and associated circuit components comprise gate 14. Transistor Q6 and associated circuit components comprise cancel channels detector and amplifier 28C.

With no signal in the cancel channel transistor Q8 conducts to return the emitter of transistor Q10 to the +4 volt line. The presence of a signal on input terminal 32 of main channel detector and amplifier 27M causes transistor Q9 to conduct, lowering its collector potential sufficiently to render transistor Q10 conductive and commence charging capacitor 31 of pulse-tone detector 17 to approximately 3 volts, thereby cutting off transistor Q11 which with associated circuit components comprises pulse-tone detector 17. The time constant of this circuit is preferably long enough to prevent transistor Q11 from conducting between sweep cycles and may be adjusted by adjusting potentiometer 30.

As long as the input to the alarm system is a steady tone, transistor Q11 is cut off. When transistor Q11 first cuts off, a pulse is coupled to transistor Q13, which with transistors Q12 and Q14 and associated circuit components, comprises pulse-tone integrators 21. Transistor Q13 remains cut off for a predetermined time related to the time constant of RC network 33. The collector resistance of transistor Q13, including the 20K potentiometer 34 and transistor Q14 comprise a current source for charging integrating capacitor 35 so that the potential of this capacitor rises at a linear rate. The duration of this charge current is related to the time constant of the circuit connected to the base of transistor Q13 and the setting of potentiometer 34.

With transistor Q11 cut off, transistor Q12 is also cut off, its collector resistor and transistor Q14 also forming a current source. The collectors of transistors Q12 and Q13 are isolated by the series diodes 36 and 37. The magnitude of the charging current provided by the latter source is considerably less than the first-mentioned source (including transistor Q13). The first-mentioned current source functions to charge capacitor 35 in response to each unfriendly noise impulse sensed by the main channel while the second-mentioned current source (including transistor Q12) functions to charge capacitor 35, but at a slower rate, in the presence of detection of a steady tone which an intruder might attempt to generate in an effort to defeat the alarm system. If such a steady tone is received, one charge of pulse current will be delivered through the first-mentioned current source while thereafter the second-mentioned current source will charge capacitor 35. This latter steady charging current typically requires approximately 30 seconds to charge capacitor 35 to the detection level.

The potentiometer 34 may be adjusted to control the number of pulses transistor Q13 must deliver to capacitor C for its potential to reach the detection level. The presence of the detected signal level triggers Schmitt trigger 22 which in turn activates relay driver 44 to operate alarm relay 23. Capacitor 35 is normally discharged through transistor Q15 and the normally closed contacts of the alarm relay 41 through bleedoff timer potentiometer 42, NPN transistor Q15 being rendered conductive only when main channel 11 is not detecting unfriendly noises. Once an alarm is sounded capacitor 35 may discharge through alarm timer potentiometer 43 and the normally opened, but then closed, contacts of the alarm relay 41 until capacitor 35 is discharged and allow it to again be charged if unfriendly noises are present.

The cancel channel 12 functions to inhibit the detection process thus described when the friendly noise source provides a spectral component at the same time that such component is received by the main channel microphone 24M. Transistor Q6 and associated circuit components comprise cancel channel detector and amplifier 28C. When this transistor receives a signal at its base indicating a certain spectral component is present in the cancel channel, it conducts to render transistor Q7 nonconductive which in turn cuts off transistor Q8 to prevent capacitor 31 from being charged through the series combination of transistors Q10 and Q8. This condition exists only during that portion of the sweep cycle when the cancel channel and the main channel are responding to the same spectral component received by the respective microphones. When the main channel microphone 24M receives a different spectral component, capacitor 31 can be charged to initiate the detection steps leading to the sounding of an alarm signal described above.

A complete alarm system preferably includes such additional features as means for producing an alarm in response to a cable being cut, mute (means for allowing the system to be activated or deactivated by an authorized person, such as through a key switch), an external alarm sensor input such as for magnetic contacts, a means for indicating an alarm in the case of a fire through use of fire sensors and metering to indicate the functioning of the apparatus. These features are well known in the art and are not described herein to avoid obscuring the inventive concepts.

There has been described a novel alarm system which continuously monitors an area at exceptionally high sensitivity for unfriendly noises while avoiding indicating an alarm caused by a friendly noise. At the same time the apparatus providing this discriminatory feature also functions as a high pass filter to further reduce the possibility of false alarms, such as those that might be provided by a truck rumbling by.

What is claimed is:

1. Signal discriminating apparatus comprising,
a source of a common modulating signal,
first and second input terminals for receiving first and second input signals respectively,
first and second modulating means coupled jointly to said common modulating signal source and respectively to said first and second input terminals for modulating said first and second input signals respectively with said common modulating signal to provide first and second modulated output signals respectively,
means for varying the frequency of said common modulating signal over a prescribed frequency range between an upper limit frequency and a lower limit frequency,
first and second detecting means for detecting spectral components centered about a predetermined frequency,
first and second selective transmission means coupled to said first and second modulating means respectively for transmitting spectral components of said first and second modulated output signals respectively centered about said predetermined frequency to said first and second detecting means respectively, and
gating means coupled to the outputs of said first and second detecting means for inhibiting the transmission of a signal from said first detecting means when said first and second selective transmission means are simultaneously transmitting spectral components of said predetermined frequency.

2. Signal discrimination apparatus in accordance with claim 1 and further comprising condition sensing means responsive to the transmission of a signal from said first detecting means by said gating means for indicating an abnormal condition.

3. Signal discrimination apparatus in accordance with claim 2 wherein said condition sensing means includes means responsive to a predetermined number of such transmissions for indicating an abnormal condition.

4. Signal discrimination apparatus in accordance with claim 3 wherein said condition sensing means includes means responsive to such transmission occurring continuously for longer than a predetermined time interval for indicating an abnormal condition.

5. Signal discrimination apparatus in accordance with claim 1 wherein each of said first means is associated with a main channel for transmitting both friendly and unfriendly audio frequency signals and each of said second means is associated with a cancel channel for transmitting substantially only friendly audio frequency signals,
the difference between said lower limit frequency and said predetermined frequency being a first difference frequency at the high end of the audio spectrum,
the difference between said upper limit frequency and said predetermined frequency being a second difference frequency that is an audio frequency lower than said first difference frequency,
the difference between said upper limit frequency and said lower limit frequency being the same as the difference between said first difference frequency and said second difference frequency.

6. Signal discrimination apparatus in accordance with claim 2 wherein said condition sensing means includes means responsive to a predetermined number of such transmissions for indicating an abnormal condition.

7. Signal discrimination apparatus in accordance with claim 6 wherein said condition sensing means includes means responsive to such transmission occurring continuously for longer than a predetermined time interval for indicating an abnormal condition.

8. Signal discrimination apparatus in accordance with claim 4 wherein said condition sensing means includes an alarm integrating capacitor,
first current source means responsive to each initiation of the transmission of a signal from said first detecting means by said gating means for providing said alarm integrating capacitor with a predetermined charge for each initiation,
and second current source means responsive to the transmission of a signal from said second detecting means by said gating means for providing said alarm integrating capacitor with a charging current during the period in which said transmission occurs.

9. Signal discrimination apparatus in accordance with claim 8 wherein said first current source means comprises means including a first transistor rendered conductive for a predetermined interval in response to said each initiation,
means including an RC network coupled to the first transistor base determining said predetermined interval,
said second current source means comprises a second transistor rendered conductive during the period in which said transmission occurs,
and further comprising a third transistor rendered nonconductive in response to said each initiation so long as said transmission occurs but at least for a prescribed time interval slightly less than the period of said means for varying the frequency of said common modulating signal,
means including said RC network for coupling said third transistor to said first transistor for rendering the latter conductive in response to initiation of nonconduction in the former, and means for coupling said third transistor to said second transistor for rendering the latter conductive in response to nonconduction in the former.

10. Signal discrimination apparatus in accordance with claim 9 and further comprising,
means for establishing the current provided by said first current source greater than that provided by said second current source for charging said alarm integrating capacitor much more rapidly from said first current source than from said second current source.

References Cited
UNITED STATES PATENTS
3,293,631 12/1966 Premack _____ 340—258

JOHN W. CALDWELL, Primary Examiner

H. I. PITTS, Assistant Examiner

U.S. Cl. X.R.

325—29; 340—147, 170, 171, 261